United States Patent
Vella et al.

(10) Patent No.: US 11,142,671 B2
(45) Date of Patent: Oct. 12, 2021

(54) ADHESIVE COMPOSITION COMPRISING METAL NANOPARTICLES

(71) Applicant: XEROX CORPORATION, Norwalk, CT (US)

(72) Inventors: Sarah J. Vella, Milton (CA); Guiqin Song, Milton (CA); Chad Steven Smithson, Toronto (CA); Kurt Halfyard, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 334 days.

(21) Appl. No.: 16/277,664

(22) Filed: Feb. 15, 2019

(65) Prior Publication Data
US 2020/0040229 A1    Feb. 6, 2020

Related U.S. Application Data

(60) Provisional application No. 62/713,916, filed on Aug. 2, 2018.

(51) Int. Cl.
*C09J 9/02* (2006.01)
*C09J 163/00* (2006.01)
*C08L 33/12* (2006.01)

(52) U.S. Cl.
CPC .............. *C09J 9/02* (2013.01); *C09J 163/00* (2013.01); *C08L 33/12* (2013.01); *C09J 2203/326* (2013.01)

(58) Field of Classification Search
CPC ........................................................ C09J 9/02
See application file for complete search history.

(56) References Cited

U.S. PATENT DOCUMENTS

| | | | |
|---|---|---|---|
| 3,907,623 | A | 9/1975 | Dowbenko |
| 4,032,513 | A | 6/1977 | Fujiwara et al. |
| 7,078,095 | B2 | 7/2006 | Tam |
| 7,294,358 | B2 | 11/2007 | Tam |

(Continued)

FOREIGN PATENT DOCUMENTS

CN    107452436 A    12/2017

OTHER PUBLICATIONS

Cinar, et al., Mechanical Fracturing of Core-Shell Undercooled Metal Particles for Heat-Free Soldering, Scientific Reports 2016, 6:21864.

(Continued)

*Primary Examiner* — Daniel H Lee
(74) *Attorney, Agent, or Firm* — MH2 Technology Law Group LLP

(57) ABSTRACT

Provided herein is conductive adhesive composition comprising at least one epoxy resin, at least one polymer chosen from polyvinyl phenols and polyvinyl butyrals, at least one melamine resin, a plurality of metal nanoparticle shaving an average particle size ranging from about 0.5 nanometers to about 100 nanometers, and at least one solvent. Also provided herein is an electronic device comprising a substrate, conductive features disposed on the substrate, a conductive electrical component disposed over the conductive features, and a conductive adhesive composition disposed between the conductive features and the conductive electrical component. Further disclosed herein are methods of making a conductive adhesive composition.

14 Claims, 2 Drawing Sheets

(56) References Cited

U.S. PATENT DOCUMENTS

| | | |
|---|---|---|
| 10,119,586 B2 | 11/2018 | Merlo et al. |
| 2004/0158008 A1 | 8/2004 | He et al. |
| 2012/0043512 A1 | 2/2012 | Liu et al. |
| 2012/0177930 A1 | 7/2012 | Henckens |
| 2012/0228560 A1 | 9/2012 | Jang et al. |
| 2012/0312467 A1* | 12/2012 | Kleine Jaeger ............ C09J 9/02 |
| | | 156/277 |
| 2014/0242362 A1 | 8/2014 | Nakako et al. |
| 2014/0312284 A1* | 10/2014 | Liu ......................... H01B 1/02 |
| | | 252/514 |
| 2017/0183536 A1* | 6/2017 | Song ...................... H05K 3/386 |
| 2017/0355871 A1* | 12/2017 | Song ...................... C08J 7/0423 |
| 2018/0242451 A1 | 8/2018 | Chopra et al. |

OTHER PUBLICATIONS

Co-pending U.S. Appl. No. 16/277,545, entitled "Compositions Comprising Eutectic Metal Alloy Nanoparticles,", filed Feb. 15, 2019.

Co-pending U.S. Appl. No. 16/277,589, entitled "Adhesive Composition Comprising Eutectic Metal Alloy Nanoparticles,", filed Feb. 15, 2019.

Co-pending U.S. Appl. No. 16/277,772, entitled "Conductive Adhesive Composition and Method for the Same,", filed Feb. 15, 2019.

Tevis, et al., Synthesis of Liquid Core—Shell Particles and Solid Patchy Multicomponent Particles by Shearing Liquid Into Complex Particles (SLICE), Langmuir 2014, 30(47): pp. 14308-14313.

Hisert J., "A guide to Low Temperature Solder Alloys," https://www.indium.com/blog/a-guide-to-low-temperature-solder-alloys.php, Jul. 11, 2017.

\* cited by examiner

ADHESIVE COMPOSITION COMPRISING METAL NANOPARTICLES

CROSS REFERENCE TO RELATED APPLICATIONS

This application claims the benefit of U.S. Provisional Application No. 62/713,916, filed Aug. 2, 2018, the disclosure of which is incorporated herein by reference in its entirety.

FIELD OF THE DISCLOSURE

This disclosure relates generally to conductive adhesive compositions comprising silver nanoparticles, which, in embodiments, can be used in printed electronics. In embodiments, the adhesive compositions herein can be jetted via inkjet, aerosol jet or other forms of jetting. In various embodiments, the conductive adhesive composition comprises at least one epoxy resin, at least one polymer chosen from polyvinyl phenols and polyvinyl butyrals, at least one melamine resin, a plurality of metal nanoparticles having an average particle size ranging from about 0.5 nanometers to about 100 nanometers, and at least one solvent. The conductive adhesive compositions disclosed herein can be digitally printed by aerosol jet or inkjet printing and demonstrate excellent adhesion strength, stability, and conductivity.

BACKGROUND

Printed electronics, or the fabrication of electronic components using liquid deposition techniques, has recently become of great interest. Such techniques may provide potentially low-cost alternatives to conventional mainstream amorphous silicon technologies for electronic applications such as thin film transistors (TFTs), light-emitting diodes (LEDs), RFID tags, photovoltaics, printed memory, and the like. However, it has been a challenge to meet the conductivity, processing, morphology, and cost requirements for practical applications of printed electronics using liquids.

Traditional processes for the fabrication of electronic circuit elements require high temperature and pressure. Accordingly, conductive elements such as interconnects are typically formed on rigid surfaces, such as silicon. High temperatures and pressures limit the use of materials available for printed electronics, which may, for example, use flexible plastic substrates that melt at low temperatures, such as at about 150° C. or less.

Certain electrically conductive materials are known in the art for low melting temperatures and thus may be suitable for use on a wide range of substrates, including flexible plastic substrates. For example, inks comprising silver nanoparticles may have a high silver content, low viscosity, and melting temperature less than or equal to about 145° C. Thus inks comprising silver nanoparticles are capable of forming conductive elements by bonding (sintering) the silver particle at low temperatures.

Despite these benefits, however, silver nanoparticle inks often do not adhere well to electronic components, thus limiting their use as interconnects. Moreover, silver nanoparticle ink compositions may have poor jettability, i.e., they may not be ideal for printing using conventional inkjet printing technologies. For example, silver nanoparticle inks may block the nozzle, drip out, or dry out on the printer head, and/or the ink droplets may misfire.

Because it is desirable to have good adhesion between electronic components of certain electronic devices, it is known to use an anisotropic conductive adhesive, commonly referred to as a Z-axis adhesive, to connect a conductive substrate, such as a circuit board, to a conventional electronic component. If the adhesive is conductive across the entire substrate, it will interfere with the traces by providing additional paths of conductivity between the elements of the substrate. An anisotropic conductive adhesive provides electrical conductivity only in a direction perpendicular to the connected surfaces and not in a direction parallel to the surfaces. Thus, the anisotropic conductive adhesive does not create undesired additional paths of conductivity between the elements of the substrate. Anisotropic conductive adhesives may include conductive particles dispersed throughout an insulating adhesive matrix, such as an epoxy or a polymer. Known adhesives, however, are typically pastes, having a viscosity of greater than about 2500 cps. They are therefore unsuitable for use in liquid printing technologies, such as inkjet printing.

There is thus a need in the art for jettable conductive adhesive compositions that enable printing, such as digital printing techniques, and are suitable for fabricating interconnects as well as conductive features such as traces, electrodes, and the like on a variety of substrates, including flexible plastic substrates.

SUMMARY

Disclosed herein is a conductive adhesive composition comprising at least one epoxy resin, at least one polymer chosen from polyvinyl phenols and polyvinyl butyrals, at least one melamine resin, a plurality of metal nanoparticles having an average particle size ranging from about 0.5 to about 100 nanometers, and at least one solvent.

Also provided herein are methods of making a conductive adhesive composition comprising mixing at least one epoxy resin, at least one polymer chosen from polyvinyl phenols and polyvinyl butyrals, at least one melamine resin, and at least one solvent to create a mixture; and adding a plurality of metal nanoparticles having an average particle size ranging from about 0.5 to about 100 nanometers to the mixture to create a conductive adhesive composition.

Also disclosed herein are electronic devices comprising a substrate, conductive features disposed on the substrate, a conductive electrical component disposed over the conductive features, and a conductive adhesive composition disposed between the conductive features and the conductive electrical component, wherein the conductive adhesive composition comprises at least one epoxy resin, at least one polymer chosen from polyvinyl phenols and polyvinyl butyrals, at least one melamine resin, and a plurality of metal nanoparticles having an average particle size ranging from about 0.5 to about 100 nanometers.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1A:
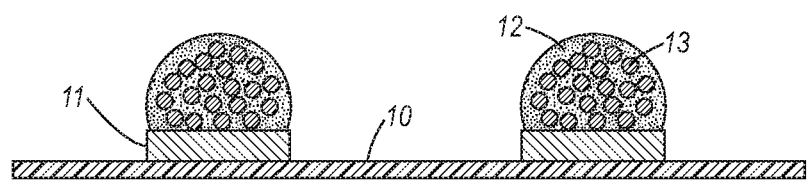
FIGS. 1A-1C are schematics of the application of a resistor to an exemplary electrical device using a conductive adhesive composition as disclosed herein.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure. The following description is merely exemplary.

Disclosed herein are conductive adhesive compositions having many uses, for example, for printed electronics. In certain embodiments, the conductive adhesive compositions disclosed herein comprise at least one epoxy resin, at least one polymer chosen from polyvinyl phenols and polyvinyl butyrals, at least one melamine resin, metal nanoparticles having an average particle size ranging from about 0.5 nanometers to about 100 nanometers, and at least one solvent.

Conventional electronics use robust interconnects such as solder balls, wire-bonding, and anisotropic conductive pastes or films to attach microchips, capacitors, diodes, and other circuit elements. Conductive adhesives may be used to attach conventional electronic silicon microchips to printed circuitry. It is desirable for a conductive adhesive composition to have high conductivity, such as a conductivity of at least about 1000 S/cm, high adhesive strength, low curing temperature, such as less than about 130° C., and a short curing time, such as less than about 2 hours. Most conductive adhesives currently available are pastes (e.g., having a viscosity greater than about 2500 cps), which precludes jetting by aerosol jet or inkjet printing. Disclosed herein are jettable conductive adhesive compositions having low viscosities (such as less than about 2500 cps) and low curing temperatures for the printed electronics industry.

The conductive adhesive compositions disclosed herein may have any desired viscosity. In certain embodiments, the viscosity ranges from about 2 cps to about 200 cps, such as from about 3 cps to about 100 cps, from about 4 cps to about 50 cps, from about 5 cps to about 20 cps, or from about 6 cps to about 10 cps, as measured at about 20° C. to about 30° C. Viscosity can be measured by any suitable or desired method as known in the art, such as with an Ares G2 Rheometer from TA Instruments. Viscosity data can be obtained, for example, at 25° C. on an Ares G2 Rheometer from TA Instruments using a 50 millimeter, 0.053 micron gap. The conductive adhesive composition disclosed herein may have any feasible cure rate. In certain embodiments, the conductive adhesive composition may cure in less than about 24 hours, such as between about 30 minutes to about 12 hours or between about 1 hour to 3 hours, such as in less than about 2 hours.

In certain embodiments, the conductive adhesive compositions disclosed herein are anisotropic. As used herein, an anisotropic composition refers to a composition that is an electrical conductor in the z-axis and has low or no conductivity in the x-axis and the y-axis. As a result, anisotropic compositions are also sometimes referred to as z-axis conducting compositions. The anisotropic compositions disclosed herein provide a matrix for electrically conducting elements that are dispersed in the composition that span the z-axis and provide the electrical conduction through the composition.

More particularly, the present disclosure provides a composition, which may be used, in embodiments, to form an adhesive between conventional electronic components such as resistors and printed conducted layers, constructed from various conductive compositions, such as metal ink compositions, e.g., silver nanoparticle inks. The conductive adhesive compositions disclosed herein can improve the adhesion between the substrates and conventional electronic components. Furthermore, the conductive adhesive compositions disclosed herein exhibit surprisingly improved dispersion, stability, conductivity, and adhesion. Accordingly, the resulting electrical devices formed from the present compositions have surprisingly excellent insulative properties.

Epoxy Resins

The conductive adhesive compositions disclosed herein comprise at least one epoxy resin. In certain embodiments of the conductive adhesive compositions disclosed herein, the at least one epoxy resin is a thermally-cured epoxy resin. In embodiments disclosed herein, there are metal nanoparticles, such as silver nanoparticles, evenly dispersed into a thermally-curable epoxy resin. The epoxy resin may, for example, be cured at about 120° C. for about 2 hours, which traps the conductive pathways into place.

The epoxy resin component may be any type of epoxy resin, including any material containing one or more reactive oxirane groups (also termed epoxy groups) as shown below.

(I)

Epoxy resins useful in embodiments disclosed herein may include aromatic, aliphatic or heterocyclic epoxy resins. The epoxies may be pure compounds or mixtures of compounds containing one, two or more epoxy groups per molecule. In some embodiments, epoxy resins may also include reactive —OH groups.

In some embodiments, the conductive adhesive compositions include glycidyl epoxy resins, such as glycidyl-ether epoxy resins, glycidyl-amine epoxy resins, and glycidyl-ester epoxy resins. Glycidyl epoxy resins are commercially available or may be prepared via a condensation reaction of an appropriate dihydroxy compound and epichlorohydrin as is known in the art.

In some embodiments, the at least one epoxy resin may include non-glycidyl epoxy resins, such as cycloaliphatic epoxy resins. Non-glycidyl epoxies are commercially available or may be formed by peroxidation of an olefinic double bond as known in the art.

Suitable epoxy resins may include those having aromatic moieties. Representative glycidyl-ether epoxy resins having aromatic moieties include diglycidyl ethers of bisphenol-A (DGEBA), which may be synthesized by reacting bisphenol-A with epichlorohydrin in the presence of a basic catalyst and which has the following structure.

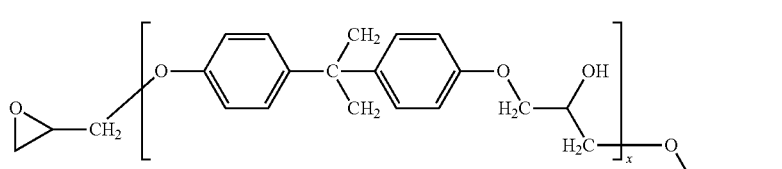
(II)

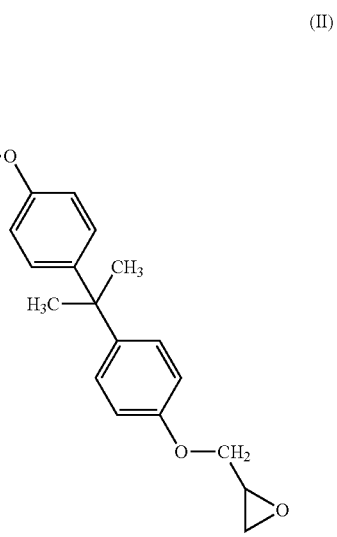
(IV)

In certain embodiments, x, the number of repeating units, ranges from 0 to 25, such as from about 2 to about 20 or about 5 to about 15.

DGEBA resins are commercially available and are marketed under the trade designations Epon® 828, Epon® 1001, Epon® 1004, Epon® 2004, Epon® 1510, and Epon® 1310 from Hexion, Inc., Columbus, Ohio and D.E.R.® 331, D.E.R.® 332, D.E.R.® 334, and D.E.R.® 439, available from Dow Chemical Co., Midland, Mich.

Other suitable bisphenol-A epoxy resins include Bisphenol A propoxylate diglycidyl ether, which is also commercially available, e.g., from Sigma-Aldrich, Inc. and which has the following structure:

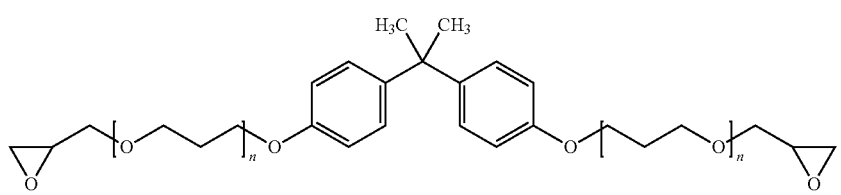
(III)

wherein n=1.

Other suitable glycidyl ether epoxy resins comprising aromatic moieties include bis(4-hydroxyphenyl)methane (known as bisphenol F) and diglycidyl ether of bromobisphenol A (2,2-bis(4-(2,3-epoxypropoxy)3-bromo-phenyl) propane). Bisphenol-F based epoxy resins are commercially available, for example D.E.R.® 354 and D.E.R.® 354LV, each available from The Dow Chemical Company, Midland, Mich.

Additional glycidyl ether epoxy resins comprising aromatic moieties that may be used with the instant compositions include phenol and cresol novolacs. As is known in the art, these epoxies may be prepared by reacting phenols or cresols, in excess, with formaldehyde in the presence of an acidic catalyst to produce phenolic novolac resin. Novolac epoxy resins are then synthesized by reacting the phenolic novolac resin with epichlorohydrin in the presence of sodium hydroxide as a catalyst. A representative phenol novalac is depicted below, wherein "n" is a number of repeat units, which may, for example range from 0 to 5.

Examples of epoxy phenolic novolac resins including epoxy bisphenol A novolac resins useful in some embodiments disclosed herein include those available under the tradenames D.E.R.® 431 and D.E.R.® 438 from The Dow Chemical Company, Midland, Mich., and EPON® SU-8, available from Hexion Specialty Chemicals, Columbus, Ohio.

Other suitable epoxy resins containing aromatic groups include those that can be prepared by the reaction of aromatic alcohols such as biphenyl diols and triphenyl diols and triols with epichlorohydrin. One representative compound is tris-(hydroxyl phenyl)methane-based epoxy available from Huntsman Corporation, Basel, Switzerland as Tactix® 742.

Additional suitable epoxy resins include glycidal amines. Glycidal amines are formed by reacting epichlorohydrin with an amine, such as an aromatic amine. An example of a suitable glycidal amine is tetraglycidyl methylene dianiline, which is represented by the following structure:

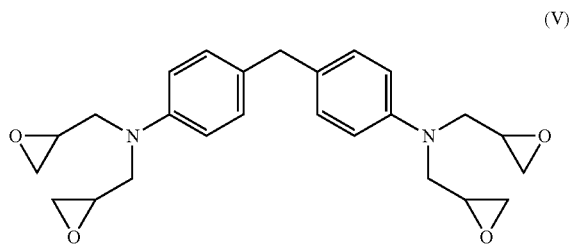 [SMILES: c1cc(N(CC2CO2)CC2CO2)ccc1Cc1ccc(N(CC2CO2)CC2CO2)cc1]

(V)

Additional suitable epoxy resins include aliphatic epoxy resins. Aliphatic epoxy resins are known in the art and include glycidyl epoxy resins and cycloaliphatic epoxides. Glycidyl aliphatic epoxy resins may be formed by the reaction of epichlorohydrin with aliphatic alcohols or polyols to give glycidyl ethers or aliphatic carboxylic acids to give glycidyl esters. This reaction may be done in the presence of an alkali, such as sodium hydroxide, to facilitate the dehydrochlorination of the intermediate chlorohydrin. These resins generally display low viscosity at room temperature, such as a viscosity ranging from about 10 to about 200 mPa·s. Exemplary glycidyl aliphatic epoxy resins for use in the conductive adhesive composition disclosed herein include trimethylolpropane triglycidyl ether, neopentyl glycol diglycidyl ether, and poly(propylene glycol) diglycidyl ether, which are commercially available, for example, from Sigma-Aldrich, Inc.

Cycloaliphatic epoxides may also be included in the present compositions. Cycloaliphatic epoxides contain one or more cycloaliphatic rings in the molecule to which an epoxide ring is fused. They are formed by the reaction of cyclo-olefins with a peracid, such as peracetic acid. Cycloaliphatic epoxides suitable for use in preparing the instant compositions include 3,4-epoxycyclohexylmethyl-3,4-epoxycyclohexane carboxylate, bis(3,4-epoxycyclohexylmethyl)adipate, vinyl cyclohexane dioxide, and the like and are commercially available from, for example, Union Carbide Corporation, a subsidiary of the Dow Chemical Company, Houston, Tex.

One or more epoxy resins can be provided in the conductive adhesive compositions disclosed herein in any suitable or desired amount. In certain embodiments, the at least one epoxy resin is present in the composition in an amount ranging from about 0.01 to about 40 percent, such as from about 5 to about 35 percent, or from about 10 to about 25 percent, by weight, based on the total weight of the composition.

Polyvinyl Phenol

The conductive adhesive compositions disclosed herein may comprise at least one polymer chosen from polyvinyl phenols and polyvinyl butyrals. Polyvinyl phenols can include, for example, the following: poly(4-vinylphenol), poly-p-vinylphenol, poly(vinylphenol)/poly(methyl acrylate), poly(vinylphenol)poly(methyl methacrylate), and poly(4-vinylphenol)poly(vinyl methyl ketone).

The polyvinyl phenol can be provided in the composition in any suitable or desired amount. The amount of the polyvinyl phenol present in the conductive adhesive composition in accordance with the present disclosure may range from about 1 wt % to about 20 wt %, such as from about 1 wt % to about 10 wt %, and from about 1 wt % to about 5 wt %, based on the total weight of the conductive adhesive composition.

Polyvinyl Butyral

The conductive adhesive compositions disclosed herein may comprise at least one of polyvinyl phenols and polyvinyl butyrals. As used herein, "polyvinyl butyral" refers to a product obtained from the hydrolysis of polyvinyl acetate to form polyvinyl alcohol or a polyvinyl alcohol polymer containing residual vinyl acetate groups; the resulting polyvinyl alcohol product being reacted with butyraldehyde under acidic conditions to form a polyvinyl butyral containing various amounts of acetate, alcohol and butyraldehyde ketal groups. In some embodiments, the polyvinyl butyral is in the form of a powder or a pellet. Methods of preparing polyvinyl butyral are known in the art and are described for example in U.S. Patent Publication No. 2012/0043512, which is herein incorporated by reference in its entirety.

Polyvinyl butyral for use in the present composition may be represented by the following formula:

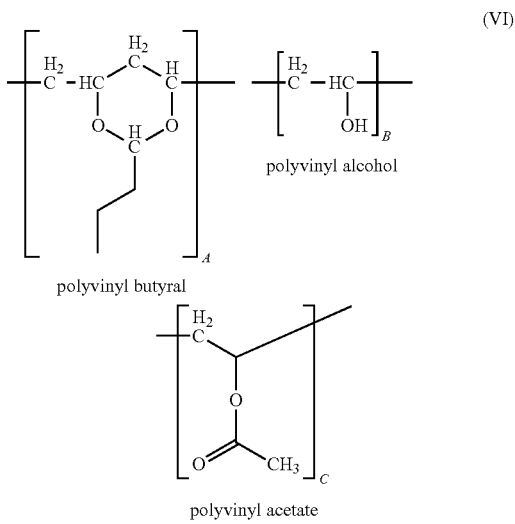

(VI)

wherein A, B and C represent a proportion of the corresponding repeat units expressed as a weight percent, wherein each repeat unit is randomly distributed along a polymer chain, and wherein the sum of A, B and C is about 100 weight percent.

In some embodiments, A is independently about 70 weight percent to about 95 weight percent, about 75 weight percent to about 90 weight percent, or about 80 weight percent to about 88 weight percent; B is independently about 5 weight percent to about 25 weight percent, about 7 weight percent to about 20 weight percent or about 11 weight percent to about 18 weight percent, such as about 17.5 weight percent; C is independently about 0 weight percent to about 10 weight percent, about 0 weight percent to about 5 weight percent or about 0 weight percent to about 3 weight percent, such as about 2.5 weight percent.

In some embodiments, the polyvinyl butyral of Formula VI has an average molecular weight (Mn) of about 10,000 to about 300,000 Daltons (Da), about 40,000 to about 200,000 Da or about 25,000 to about 150,000 Da. A representative composition of the polyvinyl butyral constitutes, on a weight basis, about 11% to 25% hydroxyl groups, calculated as polyvinyl alcohol, about 0% to about 2.5% acetate groups calculated as polyvinylacetate, with the balance being vinyl butyral groups, for example, about 80 wt. % to about 88 wt. %.

Suitable polyvinyl butyral for use with the conductive adhesive compositions disclosed herein are commercially available and include, for example, Butvar® B-79 (available from Monsanto Chemical Co., St. Louis, Mo.) having a polyvinyl butyral content of about 88 wt %, a polyvinyl alcohol content of about 11.0 wt % to about 13.5 wt %, and a polyvinyl acetate content of less than about 2.5 wt %, wherein the average molecular weight of Butvar® B-79 is from about 50,000 to about 80,000 Da. In certain embodiments, Butvar® B-76 (Monsanto Chemical Co.) may used in the conductive adhesive composition. Butvar® B-76 has a polyvinyl butyral content of about 88% by weight, a polyvinyl alcohol content of about 11.5 wt % to about 13.5 wt %, and a polyvinyl acetate content of less than about 2.5 wt %, with an average molecular weight of about 90,000 to about 120,000 Da.

The polyvinyl butyral can be provided in the composition in any suitable or desired amount. The amount of the polyvinyl butyral present in the instant conductive adhesive composition in accordance with the present disclosure may range from about 1 wt % to about 20 wt %, such as from about 1 wt % to about 10 wt %, and from about 1 wt % to about 5 wt %, based on the total weight of the conductive adhesive composition.

Melamine Resin

In some embodiments, the conductive adhesive composition further includes a cross-linking agent, such as a melamine resin, such as a melamine-formaldehyde based polymer. As used herein, the term "melamine-formaldehyde based polymer" refers to polymers formed by a condensation reaction of melamine (1,3,5-triazine-2,4,6-triamine) with formaldehyde ($CH_2O$). In some embodiments, the free hydroxyl groups of the polyvinyl phenol and/or polyvinyl butyral may bond with the melamine-formaldehyde based polymer. Thus, the polyvinyl phenol and/or polyvinyl butyral may be substituted with or "cross-linked" by the melamine-formaldehyde based polymer.

Any suitable or desired melamine-formaldehyde based polymer may be included in the conductive adhesive compositions disclosed herein. In some embodiments, the poly (melamine-co-formaldehyde) based polymer is represented by the following chemical structure:

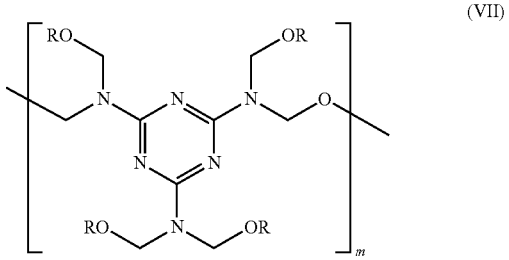

(VII)

where 1 is independently selected from hydrogen (1-1) and an alkyl, such as methyl, ethyl, propyl, isopropyl, butyl, pentyl, hexyl, and isomers thereof, and m is a number of repeats of the poly(melamine-co-formaldehyde). For example, m may be a number between about 1 and about 10. As a non-limiting example, the number molecular weight (Mn) range for the poly(melamine-co-formaldehyde) based polymer may be from about 300 grams/mole to about 1,500 grams/mole. Suitable poly(melamine-co-formaldehyde) based polymers may be obtained commercially from Sigma-Aldrich, Inc. (Saint Louis, Mo.), a subsidiary of Merck KGaA.

In another embodiment, the melamine-formaldehyde based polymer is an acrylated melamine-formaldehyde based polymer, represented by the following Formula X, wherein "m" is the number of repeats of the poly(melamine-co-formaldehyde), such as between 1 and 10, and R is H, $CH_3$ or $C_4H_9$.

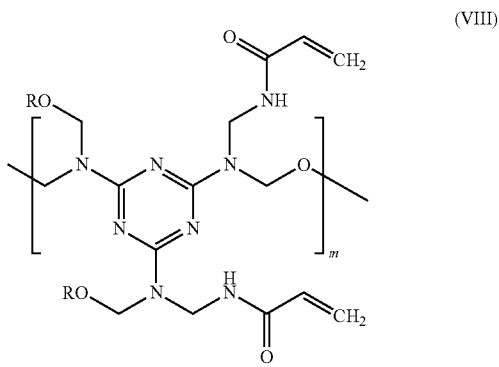

(VIII)

In certain embodiments, m ranges from about 1 to about 10, such as about 2 to about 8 or about 3 to about 7.

Acrylated melamine-formaldehyde based polymers are commercially available from Sigma-Aldrich, Inc., for example, and may have a molecular weight ranging from about 390 grams/mole to about 1,500 grams/mole.

In some embodiments, the poly(melamine-co-formaldehyde) based polymer is selected from the group consisting of methylated poly(melamine-co-formaldehyde), butylated poly(melamine-co-formaldehyde), isobutylated poly(melamine-co-formaldehyde), acrylated poly(melamine-co-formaldehyde), methylated/butylated poly(melamine-co-formaldehyde), and combinations thereof.

The poly(melamine-co-formaldehyde) based polymer can be provided in the conductive adhesive composition in any suitable or desired amount. In some embodiments, the poly(melamine-co-formaldehyde) polymer is present in an amount ranging from about 0.5 percent to about 15 percent, such as from about 1 percent to about 10 percent, or from about 1 percent to about 5 percent, by weight, based on the total weight of the conductive adhesive composition.

Metal Nanoparticles

The conductive adhesive compositions disclosed herein comprise at least one conductive particle, such as metal nanoparticles. The metal nanoparticles, such as silver nanoparticles, disclosed herein may have any shape or geometry, for example spherical. In certain embodiments, the silver nanoparticles have an average particle diameter (D10) ranging from about 0.5 nm to about 100 nm, such as from about 1 nm to about 50 nm, or from about 1 nm to about 20 nm. Volume average particle size may be measured by any suitable means, such as a light scattering particle sizer, a Transmission Electron Microscope or a Beckman Coulter Multisizer 3 (Beckman Coulter Inc., Life Sciences Division, Indianapolis, Ind.). In certain embodiments, volume average particle size of the present silver nanoparticles may be measured via dynamic light scattering using a Malvern Nano ZS Zetasizer Model 3600 (Malvern Instruments Ltd., Worcestershire, UK).

As used herein, the particle size distribution width refers to the difference between the diameter of the largest nanoparticle and the diameter of the smallest nanoparticle, or the range between the smallest and the largest nanoparticle. In certain embodiments, the width of the particle size distribution, that is, the standard deviation of the average particle size diameter of the silver nanoparticles is about ±30 nm or less, such as from about ±1 nm to about ±30 nm, from about ±2 nm to about ±25 nm, or from about ±10 nm to about ±20 nm.

The silver nanoparticles disclosed herein may, in certain embodiments, have properties distinguishable from those of silver flakes. For example, the silver nanoparticles disclosed herein may be characterized by enhanced reactivity of the surface atoms and high electrical conductivity. Further, the present silver nanoparticles may have a lower melting point and a lower sintering temperature than silver flakes. The term "sintering" refers to a process in which adjacent surfaces of metal powder particles are bonded by heating, i.e., "annealed." This is in contrast to micron-sized metal flakes, where the mode of conductivity is via ohmic contact through particle-particle touching and overlap. These flake-based inks may have conductivities several orders of magnitude lower than sintered nanoparticle conductive inks that melt together.

Due to their small size, silver nanoparticles may exhibit a melting point as low as 700° C. below that of silver flakes. In some embodiments, the silver nanoparticles of the hybrid conductive inks disclosed herein may sinter at temperatures greater than 800° C. below that of bulk silver. In certain embodiments, the silver nanoparticles of the present disclosure sinter at a temperature ranging from about 60° C. to about 250° C., such as from about 145° C. or less, or at about 140° C. or less, such as at about 130° C. or at about 120° C.

Although not wishing to be bound by theory, it is believed that the lower melting point of the silver nanoparticles disclosed herein is a result of their comparatively high surface-area-to-volume ratio, which allows bonds to readily form between neighboring particles. The large reduction in sintering temperature for metal nanoparticles enables the formation of highly conductive circuit traces or patterns on flexible plastic substrates since such substrates, e.g., polycarbonate substrates, may melt or soften at a relatively low temperature (for example, at about 150° C.).

The silver nanoparticles disclosed herein may comprise elemental silver, a silver alloy, a silver compound or combinations thereof. In certain embodiments, the silver nanoparticles may be a base material coated or plated with pure silver, a silver alloy or a silver compound. For example, the base material may be copper nanoparticles with a silver coating.

Silver alloys of the present disclosure may be formed from at least one metal selected from Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th, Mg, Ca, Sr, and Ba. Exemplary metal composites are Au—Ag, Ag—Cu, Au—Ag—Cu, and Au—Ag—Pd. In certain embodiments, the metal composites may further include at least one non-metal, such as, for example, Si, C, and Ge. Suitable silver compounds may include, for example, silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate, and derivatives thereof. In certain embodiments, the silver nanoparticles comprise elemental silver.

The silver nanoparticle component of the conductive adhesive composition as disclosed herein may be prepared by any suitable method. One exemplary method is to disperse the silver nanoparticles into at least one non-polar organic solvent and optionally at least one stabilizer under inert bubbling. The silver nanoparticle ink component may then be shaken to wet the nanoparticles and then rolled to ensure mixing. The silver nanoparticle ink may then be filtered through a glass fiber and subsequently purged with nitrogen.

The metal nanoparticle component of the conductive adhesive compositions disclosed herein may be present in any suitable or desired amount. In certain embodiments, the metal nanoparticles, such as the silver nanoparticles, are present in the conductive adhesive composition in an amount ranging from about 60% to about 95%, such as about 75% to about 90%, about 80% to about 85%, or about 80%, by weight based on the total solids weight of the conductive adhesive composition.

Surfactants

Any suitable or desired surfactant can optionally be included in the conductive adhesive compositions disclosed herein. In certain embodiments, the at least one surfactant is selected from the group consisting of silicone modified polyacrylates, polyester modified polydimethylsiloxanes, polyether modified polydimethylsiloxanes, polyacrylate modified polydimethylsiloxanes, polyester polyether modified polydimethylsiloxanes, low molecular weight ethoxylated polydimethylsiloxanes, polyether modified polydimethylsiloxanes, polyester modified polymethylalkylsiloxanes, polyether modified polymethylalkylsiloxanes, aralkyl modified polymethylalkylsiloxanes, polyether modified polymethylalkylsiloxanes, polyether modified polydimethylsiloxanes, and combinations thereof.

For example, the surfactant may be a polysiloxane copolymer that includes a polyester modified polydimethylsiloxane, commercially available from BYK-Chemie GmbH, Wesel, Germany with the trade name of BYK® 310; a polyether modified polydimethylsiloxane, commercially available from BYK-Chemie GmbH with the trade name of BYK® 330; a polyacrylate modified polydimethylsiloxane, commercially available from BYK Chemical with the trade name of BYK® Silclean® 3700 (about 25 weight percent in methoxypropylacetate); or a polyester polyether modified polydimethylsiloxane, commercially available from BYK-Chemie GmbH with the trade name of BYK® 375. The surfactant can also be a low molecular weight ethoxylated polydimethylsiloxane with the trade name Silsurf® A008 available from Siltech Corporation, Ontario, Canada. Some other examples of suitable surfactants may include BYK® 3500, BYK® 3510, BYK® 307, BYK® 333, BYK® Anti-Terra® U100, BYK® A-004, and BYK® C-409.

One or more surfactants can be provided in the conductive adhesive composition disclosed herein in any suitable or desired amount. In some embodiments, the surfactant is present in an amount ranging from about 0.01 to about 5 percent, such as from about 0.1 to about 3.5 percent, or from about 0.5 to about 2 percent, by weight, based on the total weight of the conductive adhesive composition.

Catalysts

The conductive adhesive compositions disclosed herein can optionally comprise at least one catalyst to enhance the curing process. Any suitable or desired catalyst can be selected for use in the present compositions. In certain embodiments, the at least one catalyst may be selected from the group consisting of amine salts of dodecylbenzene sulfonic acid (DDBSA), para toluene sulfonic acid, trifluoromethane sulfonic acid, and combinations thereof.

The at least one catalyst can be provided in the conductive adhesive composition in any suitable or desired amount. In certain embodiments, the at least one catalyst is present in an amount ranging from about 0.05 to about 1.5 percent, such as from about 0.08 to about 1.0 percent, or from about 0.1 to about 0.5 percent, by weight, based on the total weight of the conductive adhesive composition.

Adhesion Promoters

In certain embodiments, the conductive adhesive composition disclosed herein may comprise at least one adhesion promoter, in any suitable or desired amount. Exemplary adhesion promoter that may be envisioned include Sartomer® CN132 (aliphatic diacrylate oligomer) and Sartomer® CN133 (aliphatic triacyl oligomer).

Solvents

Any suitable or desired solvent can be selected for the present conductive adhesive compositions. In some embodiments, the at least one solvent is selected from the group consisting of propylene glycol methyl ether acetate (PGMEA), di(propylene glycol) methyl ether acetate (Di-PGMEA), (propylene glycol)methyl ether (PGME), di(propylene glycol)methyl ether (Di-PGME), methyl isobutyl ketone (MIBK), diisobutyl ketone (DIBK), toluene, methyl isobutyl ketone, butylacetate, methoxypropylacetate, xylene, tripropyleneglycol monomethylether, dipropyleneglycol monomethylether, propoxylated neopentylglycoldiacrylate, and combinations thereof.

In certain embodiments, the solvent can be a non-polar organic solvent selected from the group consisting of hydrocarbons such as alkanes, alkenes, alcohols having from about 7 to about 18 carbon atoms such as undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dedecanol, 4-dedecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; alcohols such as terpineol ($\alpha$-terpineol), $\beta$-terpineol, geraniol, cineol, cedral, linalool, 4-terpineol, 3,7-dimethylocta-2,6-dien-1ol, 2-(2-propyl)-5-methyl-cyclohexane-1-ol; isoparaffinic hydrocarbons such as isodecane, isododecane; commercially available mixtures of isoparaffins such as Isopar® E, Isopar® G, Isopar® H, Isopar® L, Isopar® V, Isopar® G, manufactured by Exxon Chemical Company; Shellsol® manufactured by Shell Chemical Company; Soltrol® manufactured by Chevron Phillips Chemical Company; Begasol® manufactured by Mobil Petroleum Co., Inc.; IP Solvent 2835 manufactured by Idemitsu Petrochemical Co., Ltd; naphthenic oils; aromatic solvents such as benzene, nitrobenzene, toluene, ortho-, meta-, and para-xylene, and mixtures thereof; 1,3,5-trimethylbenzene (mesitylene); 1,2-, 1,3-, and 1,4-dichlorobenzene and mixtures thereof, trichlorobenzene; cyanobenzene; phenylcyclohexane and tetralin; aliphatic solvents such as isooctane, nonane, decane, dodecane; cyclic aliphatic solvents such as ethylcyclohexane, dicyclohexyl and decalin; and mixtures and combinations thereof.

In certain embodiments, two or more solvents can be used.

One or more solvents can be included in the conductive adhesive composition in any suitable or desired amount. In some embodiments, the solvent is present in an amount ranging from about 50 to about 90 percent, such as from about 60 to about 80 percent or from about 70 to about 80 percent, by weight, based on the total weight of the conductive adhesive composition.

Percent Solids

In some embodiments, the conductive adhesive compositions disclosed herein comprise from about 10 to about 60 weight percent solids, such as from about 15 to about 45 weight percent solids, or from about 20 to about 40 weight percent solids, based on the total weight of the composition in accordance with the present disclosure. In certain embodiments, the conductive adhesive composition contains a selected solids content of less than about 50 weight percent solids, based on the total weight of the instant composition. In certain embodiments, the metal nanoparticles comprise about 60 weight percent to about 95 weight percent, such as from about 75 weight percent to about 90 weight percent, or about 80 weight percent to about 85 weight percent of the composition, based on the total solids weight of the composition.

Electronic Devices

In certain embodiments, disclosed herein is an electronic device including a substrate, a set of conductive terminals on the substrate, an electronic component opposite the substrate, a set of conductive terminals attached to the electronic component and facing the substrate, and a conductive adhesive composition, such as an anisotropic conductive adhesive composition, disposed between the electronic component and the substrate. The conductive adhesive composition may comprise conductive particles, such as metal nanoparticles, distributed in an insulating medium in a substantially uniform manner.

An exemplary application of an anisotropic conductive adhesive composition includes a group of conductive elements. The composition is positioned between two sets of conductive terminals. A charge or field is generated by or passed through a substrate, which may be flexible, to the terminals. The field may pass from one terminal to another terminal through the anisotropic conductive adhesive composition. A top layer, such as an electronic component like a resistor, may comprise a set of conductive contact pads and may cover the anisotropic conductive adhesive composition and the terminals.

To create conductivity from the terminals to the electronic component through the conductive particles, the anisotropic conductive adhesive composition may be sandwiched between the top and bottom layers, i.e., between the substrate and the electronic component. When sandwiched in between, the conductive particles, such as silver nanoparticles, may deform and provide a larger conductive surface area that contacts the terminals and conductive contact pad.

The substrate may be any suitable substrate including silicon, a glass plate, a plastic film, sheet, fabric, synthetic paper, or mixtures thereof. For structurally flexible devices, plastic substrates such as polyester, polycarbonate, polyimide sheets, polyethylene terephthalate (PET) sheets, polyethylene naphthalate (PEN) sheets, and the like, including mixtures thereof, may be used. The thickness of the substrate can be any suitable thickness, such as from about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

Figure 1B:
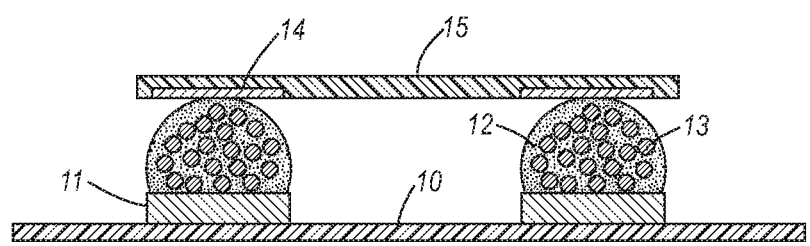
Figure 1C:
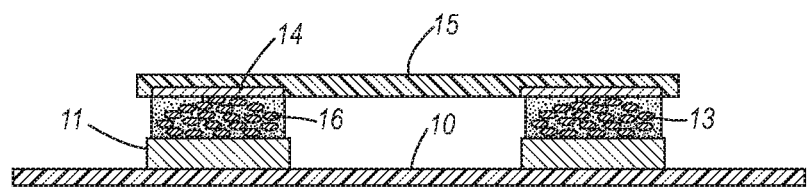
Figure 2A:
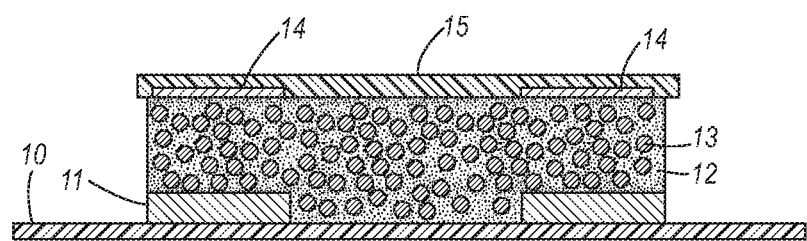
FIGS. 2A-2B are schematics of the application of a resistor to an exemplary electrical device using an anisotropic conductive adhesive composition as disclosed herein.
Figure 2B:
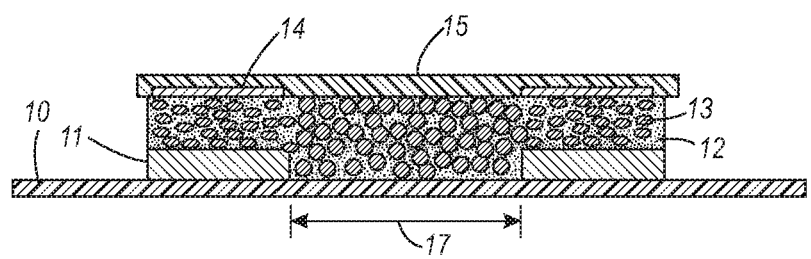

As shown in FIGS. 1A-1C and 2A-2B, in certain exemplary embodiments of the electrical devices disclosed herein, there is a substrate 10, at least two areas formed from conductive ink 11 on the surface of the substrate 10, a conventional electronic component 15, such as a resistor, comprising at least two conductive contact pads 14 positioned over the at least two areas formed from conductive ink, and an adhesive conductive composition 12 disposed in between the conductive ink 11 and the conventional electronic component 15, wherein the adhesive conductive composition 12 comprises metal nanoparticles 13.

In certain embodiments, the areas formed from conductive ink 11 may be spaced such that there is a gap 17 between a first area 11 and a second area 11 formed from conductive ink. In various embodiments of the disclosure, the adhesive conductive composition 12 comprising metal nanoparticles 13 is not disposed inside the gap 17, such that the adhesive conductive composition 12 is on the surface of the areas formed from conductive ink 11. See, e.g., FIGS. 1A-1C. In certain embodiments, the adhesive conductive composition 12 comprising metal nanoparticles 13 is disposed inside the gap 17, such that the adhesive conductive composition 12 is both on the surface of the areas formed from conductive ink 11 and on the surface of the substrate 10. See, e.g., FIGS. 2A-2B.

The conductive adhesive composition may be disposed on the substrate and/or conductive ink using any suitable method. For example, the present composition may be disposed on the substrate and/or conductive ink by solution depositing. Solution depositing as used herein refers to a process whereby a liquid is deposited upon the substrate to form a coating or layer. Solution depositing includes, for example, one or more of spin coating, dip coating, spray coating, slot die coating, flexographic printing, offset printing, screen printing, gravure printing or ink jet printing the conductive adhesive composition onto the substrate and/or conductive ink. In certain embodiments, the conductive adhesive composition is disposed on the substrate and/or conductive ink by ink jet printing.

In some embodiments, the conductive adhesive composition disposed on the substrate and/or the conductive ink is cured. The conductive adhesive composition can be cured at any suitable or desired temperature for any suitable period of time. In some embodiments, the conductive adhesive composition can be cured at a temperature ranging from about 80° C. to about 200° C., such as from about 100° C. to about 180° C., or from about 120° C. to about 160° C. for a period of time ranging from about 0.5 to about 6 hours, from about 1 to about 4 hours, or from about 2 to about 3 hours. In embodiments, the present composition can be cured at about 120° C. for about 2 hours, or at 160° C. for about 6 hours or at about 200° C. for about 0.5 hours.

In some embodiments, the electronic device includes a conductive material. Any suitable or desired conductive material can be used to form conductive features on the present device. Typically, a conductive composition, such as a metal ink composition, is used to provide the conductive features, and suitable metal ink compositions may include, for example, silver nanoparticles dispersed within an ink vehicle, such as aromatic or non-aromatic hydrocarbons including benzene, toluene, xylene, ethylbenzene, ethylcyclohexane, phenylcyclohexane, bicyclohexyl, decalin, and combinations thereof.

The fabrication of conductive features, such as an electrically conductive element, from a metal ink composition, for example, from a nanoparticle metal ink such as a nanosilver ink composition, can be carried out by depositing the nanosilver ink composition, for example, onto a substrate using any suitable deposition technique including solution processing as described herein. Conductive features, as used herein, are distinguished from the conductive adhesive composition disclosed herein. In some embodiments, the conductive features are formed by heating the conductive composition. In some embodiments, prior to heating, the layer of the deposited conductive composition may be electrically insulating or may have very low electrical conductivity; however, heating results in an electrically conductive layer composed of annealed metal particles, for example, such as annealed silver nanoparticles, which increases the conductivity. In some embodiments, the annealed silver nanoparticles, for example, may be coalesced or partially coalesced silver nanoparticles. In other embodiments, it may be possible that in the annealed metal nanoparticles, for example, the silver nanoparticles, achieve sufficient particle-to-particle contact to form the electrically conductive layer without coalescence.

The deposited conductive composition, such as a metal ink composition, is heated to any suitable or desired temperature, such as from about 70° C. to about 250° C., or any temperature sufficient to induce annealing of the metal particles, for example, and thus form an electrically conductive layer, which is suitable for use as an electrically conductive element in electronic devices. The heating temperature is one that does not cause adverse changes in the properties of previously deposited layers or the substrate. In some embodiments, use of low heating temperatures allows use of low cost plastic substrates, which have an annealing temperature of below 140° C.

The heating can be for any suitable or desired time, such as from about 0.01 hours to about 10 hours. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to anneal the metal nanoparticles, for example. These techniques include thermal heating (for example, at hot plate, an oven, and a burner), infra-red ("IR") radiation, laser beam, flash light, microwave radiation, or ultraviolet ("UV") radiation, or a combination thereof.

In some embodiments, after heating, an electrically conductive line, such as an electrically conductive silver line, is formed on the substrate that has a thickness ranging from about 0.1 to about 20 micrometers, or from about 0.15 to about 10 micrometers. In certain embodiments, after heating, the resulting electrically conductive line has a thickness of from about 0.1 to about 2 micrometers.

The conductivity of the conductive features, such as an electrically conductive line, which is produced by heating the deposited conductive composition is more than about 10,000 Siemens/centimeter (S/cm), more than about 50,000 S/cm, more than about 80,000 S/cm, more than about 100,000 S/cm, more than about 125,000 S/cm, more than about 150,000 S/cm or more than about 200,000 S/cm. Typically, the conductivity ranges from about 50,000 S/cm to about 200,000 S/cm, such as about 80,000 S/cm to about 150,000 S/cm, such as about 100,000 S/cm to about 125,000 S/cm.

The resistivity of the conductive features, such as an electrically conductive line, which is produced by heating the deposited conductive composition is less than about $1.0 \times 10^{-4}$ ohms-centimeter (ohms-cm), less than about $2.0 \times 10^{-5}$ ohms-cm, less than about $1.25 \times 10^{-5}$ ohms-cm, less than about $1.0 \times 10^{-5}$ ohms-cm, less than about $8.0 \times 10^{-6}$ ohms-cm, less than about $6.6 \times 10^{-6}$ ohms-cm or less than about $5.0 \times 10^{-6}$ ohms-cm. Typically, the resistance ranges from about $2.0 \times 10^{-5}$ ohms-cm to about $5.0 \times 10^{-6}$ ohms-cm, such as about $1.25 \times 10^{-5}$ ohms-cm to about $6.6 \times 10^{-6}$ ohms-cm, such as about $1.0 \times 10^{-5}$ ohms-cm to about $8.0 \times 10^{-6}$ ohms-cm.

The device of the present disclosure may be used for any suitable or desired application, such as for electrodes, conductive pads, interconnects, conductive lines, conductive tracks, and the like, in electronic devices such as thin film transistors, organic light emitting diodes, printed antenna, and other electronic devices requiring conductive elements or components.

Cured Conductive Adhesive Compositions

Also provided herein is a cured conductive adhesive composition formed from a composition comprising at least one epoxy resin, at least one polymer chosen from polyvinyl phenols and polyvinyl butyrals, at least one melamine resin, metal nanoparticles having an average particle size ranging from about 0.5 nanometers to about 100 nanometers, and at least one solvent as described herein.

In some embodiments, the cured conductive adhesive comprises conductive features, such as an electrically conductive line, as described herein. In certain embodiments, the conductivity of the conductive features of the cured film is more than about 1000 Siemens/centimeter (S/cm), such as more than about 10,000 Siemens/centimeter (S/cm), more than about 50,000 S/cm, more than about 80,000 S/cm, more than about 100,000 S/cm, more than about 125,000 S/cm, more than about 150,000 S/cm or more than about 200,000 S/cm. For example, in certain embodiments, the conductivity of the cured conductive adhesive comprising the conductive features, such as an electrically conductive line, ranges from about 50,000 S/cm to about 200,000 S/cm, such as about 80,000 S/cm to about 150,000 S/cm, or about 100,000 S/cm to about 125,000 S/cm.

In some embodiments, the resistivity of the conductive features, such as an electrically conductive line of the cured conductive adhesive is less than about $1.0 \times 10^{-4}$ ohms-centimeter (ohms-cm), less than about $2.0 \times 10^{-5}$ ohms-cm, less than about $1.25 \times 10^{-5}$ ohms-cm, less than about $1.0 \times 10^{-5}$ ohms-cm, less than about $8.0 \times 10^{-6}$ ohms-cm, less than about $6.6 \times 10^{-6}$ ohms-cm, or less than about $5.0 \times 10^{-6}$ ohms-cm. In certain embodiments, the resistivity of the cured conductive adhesive comprising the conductive features, such as an electrically conductive line, ranges from about $2.0 \times 10^{-5}$ ohms-cm to about $5.0 \times 10^{-6}$ ohms-cm, such as about $1.25 \times 10^{-5}$ ohms-cm to about $6.6 \times 10^{-6}$ ohms-cm, or about $1.0 \times 10^{-5}$ ohms-cm to about $8.0 \times 10^{-6}$ ohms-cm.

Methods of Forming Conductive Elements

The conductive adhesive compositions disclosed herein may be prepared by mixing the metal nanoparticle component with a first component comprising the at least one epoxy resin, at least one polymer chosen from polyvinyl phenols and polyvinyl butyrals, the at least one melamine resin, and the at least one solvent, as disclosed herein.

Also provided herein is a process for forming conductive features, such as an electrically conductive line as described herein, on a substrate including depositing a conductive adhesive composition onto a substrate and/or conductive element, such as a conductive ink, as described herein, and curing the conductive adhesive composition to form a cured conductive adhesive. The conductive features can be fabricated by any suitable or desired method. In certain embodiments, the conductive features can be prepared by solution processing techniques such as ink jet printing on the substrates with a pre-applied interlayer. The conductive features show high conductivity with significantly improved adhesion after annealing at a suitable temperature.

In certain embodiments, the conductive adhesive composition is deposited onto a substrate and/or conductive element by ink jet printing. For example, in certain embodiments, aerosol jet printing is used for deposition. As used herein, "aerosol jet printing" refers to a process that involves atomization or aerosolization of the conductive adhesive composition, producing droplets on the order of one to two microns in diameter. The atomized droplets may be entrained in a gas stream and delivered to a print head. At the print head, an annular flow of gas may be introduced around the aerosol stream to focus the droplets into a tightly collimated beam. The combined gas streams may then exit the print head through a converging nozzle that compresses the aerosol stream to a small diameter, for example a diameter ranging from about 1 micron to about 100 microns. The jet exits the print head and is deposited on a substrate or other surface. The resulting patterns can have features ranging from about 5 microns to about 3000 microns wide, with layer thickness ranging from tens of nanometers to about 25 microns, such as from about 1 micron to about 20 microns.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

EXAMPLES

The following Examples are being submitted to further define various species of the present disclosure. These Examples are intended to be illustrative only and are not intended to limit the scope of the present disclosure. Parts and percentages are by weight unless otherwise indicated.

Example 1A—Preparation of Base Adhesive Composition

Base adhesive solutions were prepared containing the formulations as set forth in Table 1 below.

TABLE 1

| Formulation of Base Solution | | | | | | | |
|---|---|---|---|---|---|---|---|
| PLGDE (Mn 380) (g) | PMMF (g) | PVP (g) | PGMEA (g) | Di-PGMEA solvent (g) | Di-PGME (g) | Solid (%) | Total (wt %) |
| 13.2 | 2.8 | 2.5 | | 16.5 | 15.0 | 37.0 | 50.0 |
| 35.7 | 7.6 | 6.7 | 50.0 | | | 50.0 | 100.0 |
| 13.2 | 3.75 | 3.75 | 29.30 | | | | 50.0 |

PLGDE—polypropylene glycol diglycidyl ether
PMMF—poly(melamine-co-formaldehyde)
PVP—polyvinyl phenol
PGMEA—propylene glycol methyl ether acetate
Di-PGMEA—di(propylene glycol) methyl ether acetate
Di-PGME—di(propylene glycol)methyl ether A 60 mL bottle (Bottle A) and a 125 mL bottle (Bottle B) were air-blown to clean, and a magnetic stir bar was added into each bottle. Bottle B and its lid were weighed, and the weight recorded. 16.5 g of di(propylene glycol) methyl ether acetate (Di-PGMEA) solvent was loaded into Bottle A, and then 2.8 g poly(melamine-co-formaldehyde) (PMMF) was added. Bottle A was stirred at 250 rpm and run for at least 5 minutes until the PMMF was completely dissolved. Next, 15 g of di(propylene glycol)methyl ether (Di-PGME) solvent was added to Bottle B, followed by 13.2 g polypropylene glycol diglycidyl ether (PLGDE), and the solution was mixed for at least 5 minutes.

The contents of Bottle A and Bottle B were combined by pouring the solution of Bottle A into Bottle B, and the combined solutions were mixed for about 30 minutes. Next, 2.5 g of polyvinyl phenol (PVP) was slowly added into Bottle B and then mixed for two hours, until all of the PVP powder was dissolved.

Example 1B—Preparation of Conductive Adhesive Composition

A magnetic stir bar was added to a 60 mL bottle, and the bottle was loaded with 12 g PGMEA. Then 15 g of a base adhesive composition, having a solids content of 5.55 g (15 g×37%), was added and mixed for 30 minutes. 22.5 g silver nanoparticles (AgNP) were added, such that the amount of AgNP after drying was about 80.2% (22.5/28.05). The bottle was filled with argon air to protect the solution, and the bottle was placed on a plate and mixed for two hours at low speed (about 200 rpm). The bottle was kept rolling overnight, and the resultant sample conductive adhesive composition was aerosol print tested.

Example 1C—Characterization of Conductive Adhesive Composition

The conductive adhesive composition prepared in Example 1B was evaluated to analyze the silver nanoparticle particle size distribution, as well as other physical characteristics of the composition.

Nanosilver Particle Size Distribution.

| Sample ID | Z-ave overall (nm) | Z-ave PD (nm) | D (1, 0) (nm) |
|---|---|---|---|
| Silver Nanoparticle | 18.9 | 9.46 | 7.11 |

Rheology. The average shear viscosity (40-400 s$^{-1}$) was 7.0 cps.

Printing of Conductive Adhesive Composition. The conductive adhesive composition was jetted using an Optomec Aerosol Jet System in Pneumatic Aerosol mode (PA). A 300 μm nozzle was used with a 3 mm offset distance between the nozzle and the substrate. The printing rate was maintained at 10 mm/s. The following gas flow parameters were used to print the conductive adhesive composition: Sheath Gas=50 cm$^3$/min, Atomization Gas=650 cm$^3$/min. The conductive adhesive composition was jetted onto flexible polycarbonate and rigid polycarbonate substrates.

Resistance Test Measurements. A test pattern was printed with silver nanoparticle ink on polycarbonate. There were two lines each terminated in a pad. Between the two pads was a 5 mm gap. The conductive adhesive composition was tested in two ways: 1) printed only the pads; and 2) printed on the pads and across the gap.

For the first test, the conductive adhesive composition was printed directly on the pads, with the resistor placed across the gap of the printed silver pads, and then pressure was applied to the resistor. The conductive adhesive composition was cured at 120° C. for 2 hours. See FIGS. 1A-1C.

In the second test, the conductive adhesive was printed on the silver pads and across the gap, with the resistor placed across the gap of the printed silver pads, and then pressure was applied to the resistor. The conductive adhesive composition was cured at 120° C. for 2 hours. See FIGS. 2A-2B.

The gap was spanned by a surface mount 100Ω resistor (603 package). The conductive adhesive was evaluated by measuring the resistance across the two silver lines. The leads of the digital multimeter were placed on either side of the gap on the conductive silver lines. The adhesive is deemed sufficiently conductive if the measured resistance is ~100Ω, indicating that the conductive adhesive is not contributing additional resistance. When the conductive adhesive was printed on the silver pads and across the gap between the pads, the multimeter measured 115.3Ω, indicating that the conductive adhesive does not significantly contribute additional resistance to the "circuitry" (~15Ω). When the conductive adhesive was printed only on the silver pads, the multimeter measured 111.4Ω, indicating that the conductive adhesive does not significantly contribute additional resistance to the "circuitry" (~11Ω).

While not wishing to be bound by theory, it is hypothesized that the extra 10-15Ω could be from resistance in the silver lines, the contact resistance between the probes and the silver lines, from the conductive adhesive, or a combination of these possibilities. Given that a resistance was measured indicates that the adhesive was functioning anisotropically, since there is no shorting across the gap (i.e., there is not a conductive pathway in the region between the gap even though there was adhesive.

Adhesion Test. Adhesion was assessed qualitatively using several steps in attempts to remove the resistor from the silver pads, in increasing amounts of applied force. First, the polycarbonate plaque was turned over. Second, the back of the plaque was tapped with the three fingers. Third, the plaque was turned on its side and the tapped on a table. Finally, force was applied to the resister using tweezers to pop it off. The cured conductive adhesive composition required applied force (i.e., the use of tweezers) to remove the resistor from the silver pads. The resistor was not removed by merely turning the plaque over, tapping the back of the plaque with fingers, or tapping the plaque on a table. This demonstrates that the cured conductive adhesive composition had adequate adhesion.

What is claimed is:

1. A conductive adhesive composition comprising:
   at least one epoxy resin present in the conductive adhesive composition in an amount ranging from about 5 to about 40 percent by weight;
   at least one polymer present in the conductive adhesive composition in an amount ranging from about 1 to about 20 percent by weight and chosen from polyvinyl phenols and polyvinyl butyrals;
   at least one melamine resin;
   a plurality of metal nanoparticles having an average particle size ranging from about 0.5 nanometers to about 100 nanometers; and
   at least one solvent.

2. The conductive adhesive composition of claim 1, wherein the plurality of metal nanoparticles are silver nanoparticles.

3. The conductive adhesive composition of claim 1, wherein the plurality of metal nanoparticles are present in the conductive adhesive composition in an amount ranging from about 60% to about 95%, based on a total solids weight of the conductive adhesive composition.

4. The conductive adhesive composition of claim 1, having a solids content ranging from about 20% to about 80%, based on the total weight of the conductive adhesive composition.

5. The conductive adhesive composition of claim 1, wherein at least one solvent is selected from the group consisting of propylene glycol methyl ether acetate, di(propylene glycol) methyl ether acetate, (propylene glycol) methyl ether, di(propylene glycol)methyl ether, methyl isobutyl ketone, and diisobutyl ketone.

6. The conductive adhesive composition of claim 1, wherein the at least one melamine resin is selected from the group consisting of a methylated poly(melamine-co-formaldehyde), butylated poly(melamine-co-formaldehyde), isobutylated poly(melamine-co-formaldehyde), acrylated poly(melamine-co-formaldehyde), and methylated/butylated poly(melamine-co-formaldehyde).

7. The conductive adhesive composition of claim 1, wherein the composition has a viscosity ranging from about 2 cps to less than about 200 cps.

8. The conductive adhesive composition of claim 1, wherein the at least one epoxy resin is selected from the group consisting of bisphenol A diglycidyl ether, bisphenol A propoxylate diglycidyl ether, trimethylolpropane triglycidyl ether, neopentyl glycol diglycidyl ether.

9. The conductive adhesive composition of claim 1, further comprising at least one adhesion promoter.

10. The conductive adhesive composition of claim 1, wherein the at least one polymer is a polyvinyl phenol selected from the group consisting of poly(4-vinylphenol), poly-p-vinylphenol, poly(vinylphenol)/poly(methyl acrylate), poly(vinylphenol)/poly(methyl methacrylate), and poly(4-vinylphenol)/poly(vinyl methyl ketone).

11. A method of making a conductive adhesive composition comprising:
    mixing at least one epoxy resin, at least one polymer chosen from polyvinyl phenols and polyvinyl butyrals; at least one melamine resin; and at least one solvent to create a mixture; and
    adding a plurality of metal nanoparticles having an average particle size ranging from about 0.5 nanometers to about 100 nanometers to the mixture to create a conductive adhesive composition,
    wherein the at least one epoxy resin is present in the conductive adhesive composition in an amount ranging from about 5 to about 40 percent by weight and the at least one polymer is present in the conductive adhesive composition in an amount ranging from about 1 to about 20 percent by weight.

12. The method of claim 11, wherein the plurality of metal nanoparticles are silver nanoparticles.

13. The method of claim 11, wherein the plurality of metal nanoparticles are present in the conductive adhesive composition in an amount ranging from about 60% to about 95%, based on a total solids weight of the conductive adhesive composition.

14. The method of claim 11, wherein the conductive adhesive composition has a solids content ranging from about 30% to about 50%, based on the total weight of the conductive adhesive composition.

* * * * *